July 14, 1925. Re. 16,115

J. H. SCHLAFLY

METHOD OF MAKING CORRUGATED CORES

Original Filed Feb. 23, 1922

Inventor

Julius H. Schlafly

By Frease and Bond

Attorneys

Reissued July 14, 1925. Re. 16,115

UNITED STATES PATENT OFFICE.

JULIUS H. SCHLAFLY, OF CANTON, OHIO, ASSIGNOR TO UNITED ALLOY STEEL CORPORATION, OF CANTON, OHIO, A CORPORATION OF NEW YORK.

METHOD OF MAKING CORRUGATED CORES.

Original No. 1,434,068, dated October 31, 1922, Serial No. 538,783, filed February 23, 1922. Application for reissue filed June 23, 1923. Serial No. 647,366.

*To all whom it may concern:*

Be it known that I, JULIUS H. SCHLAFLY, a citizen of the United States, residing at Canton, in the county of Stark and State of Ohio, have invented a certain new and useful Improved Method of Making Corrugated Cores, of which the following is a specification.

The invention relates to the manufacture of transversely-corrugated sheet-metal cores for concrete floor construction; and the object of the improvement is to form the cores with deeper corrugation than can be made by ordinary methods, so as to increase the supporting strength of the cores.

A common method of making such cores is by a pressing or stamping operation to form the transverse corrugations at the same time the core is shaped from a plain sheet of metal, and as the length of the sheet is necessarily shortened by the formation of the corrugations of the core, the depth to which the corrugations can be formed is limited and the supporting strength of the core is likewise limited.

The improved method involves an initial corrugation of a plain sheet so as to accumulate or gather the metal and shorten the sheet to or about the length of the finished core, a subsequent shaping of the core to form the side flanges and partially form the arch angles while forming deep corrugations from the gathered metal, followed by a final shaping of the arch angles.

The initial corrugations can be made in any form or of any dimensions which will accumulate sufficient metal to permit the formation of the desired deep corrugations without any considerable stretching of the metal beyond the necessary tension which is desirable to take up all the kinks and bends there may be in the ordinary sheet; and the final corrugation of the flanges may correspond to the corrugations in the body of the core, or may be reversed at the angle of the flange in well known manner so as to increase the strength of the flanges; and both arch angles may be finally shaped by a single operation or by separate operations as may be desired.

The accompanying drawings forming a part hereof illustrate various steps which may be employed in carrying out the improved method, in which drawings—

Figure 1:
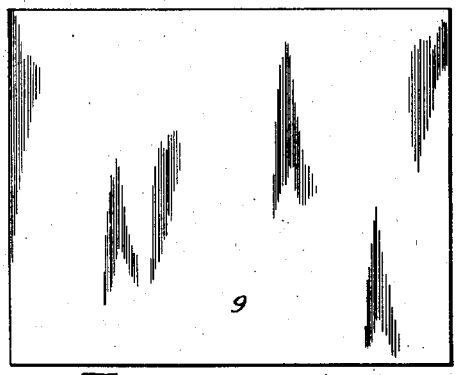
Figure 2:
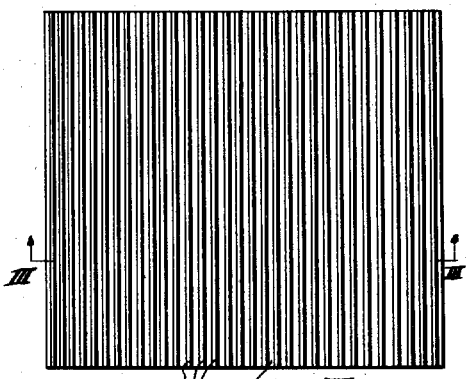
Figure 3:
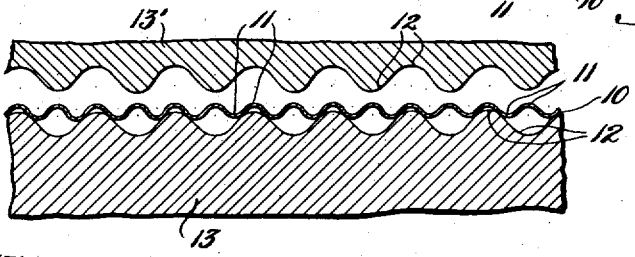
Figure 4:
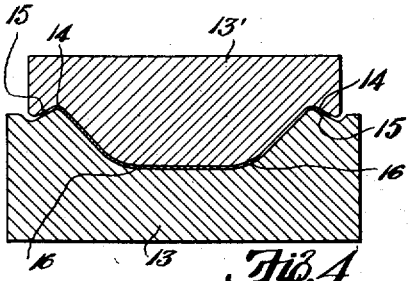
Figure 5:
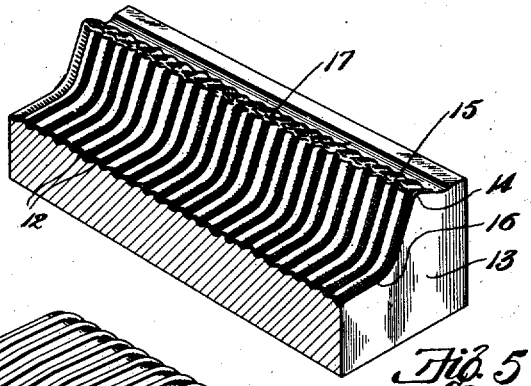
Figure 6:
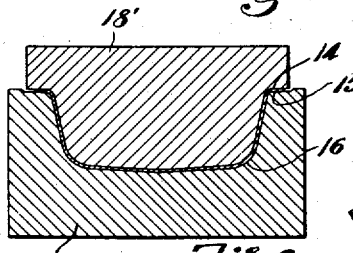
Figure 8:
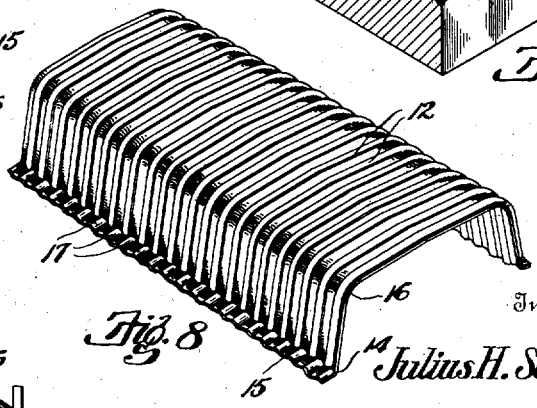
Figure 7:
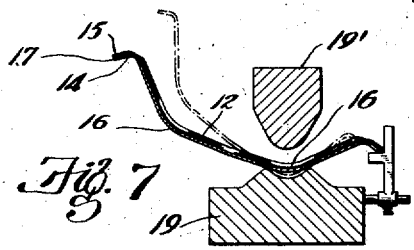

Figure 1 is a plan of a plain sheet;

Fig. 2, a plan of the same after it has been initially corrugated;

Fig. 3, an enlarged longitudinal section of the initially corrugated sheet on line III—III, Fig. 2, showing a like section of deep corrugating dies;

Fig. 4, a transverse section of deep corrugating and partial shaping dies, showing the sheet therein with the flange angles formed and the arch angles partly formed;

Fig. 5, a perspective section of one-half of the lower deep corrugating and partial shaping die, with half a core shaped therein;

Fig. 6, a transverse section of dies which may be used for finally shaping both arch angles by a single operation;

Fig. 7, a transverse section of dies which may be used for finally separately shaping the arch angles by successive operations; and Fig 8, a perspective view of the completed core, with reversely corrugated flanges.

Similar numerals refer to similar parts throughout the several figures of the drawings.

A plain sheet 9 is initially formed with transverse corrugations by any well known rolling, pressing, or stamping operation, so as to accumulate or gather the material uniformly throughout the sheet and reduce its length to substantially the length of the finished core.

The corrugations may ordinarily be made without much, if any, stretching of the metal, but for very deep corrugations, the metal can be stretched to or near its elastic limit; and the character of the corrugations may vary from the middle to the ends of the sheet, to compensate for the action of the dies in the succeeding steps of the process.

The shortened sheet 10 may have rounded corrugations 11 of about half the depth and width of the deep corrugations 12 to be finally formed, so as to accumulate the necessary metal required for the deep corrugations; but the particular shape and size of the initial corrugations, as shown in Figs. 2 and 3, are not essential to the subsequent steps of the improved method.

Complementary dies 13 and 13′, as shown in Figs. 3, 4 and 5, may be employed to form the deep transverse corrugations 12 and to shape the longitudinal angles 14 of the side flanges 15 and partially shape the longitudinal arch angles 16, as shown in Figs. 4 and 5. The side flanges may be formed flat, but are preferably corrugated, as shown.

The deep corrugations are uniformly formed contiguously in a continuous series throughout the length of the sheet, and the corrugations of the side flanges 15 may conform to the corrugations in the body of the core; but the flange corrugations 17, are preferably reversed at the angle of the flange to avoid a straining or rupture of the metal at this point, and to increase the strength of the flange angle.

The partially formed longitudinal arch angles 16 may be fully formed, both at the same time by a single operation, by complementary dies 18 and 18′, as shown in Fig. 6; or may be finally formed separately, by complementary dies 19 and 19′, as shown in Fig. 7; thereby completing the formation of the core with deep corrugations as shown in Fig. 8.

It is evident that the described method of corrugating and shaping a sheet may be employed for making an arched core without any side flanges; and also that the same method of corrugating a sheet may be employed without shaping the same to make an arched core.

And it will be understood that the deeper contiguous corrugations may be formed from the accumulated metal, substantially without any stretching or compression of the metal or any further contraction of the initially corrugated sheet.

I claim:

1. The method of making transversely-corrugated sheet-metal cores for concrete floor construction and the like, which consists in transversely corrugating a sheet to accumulate the metal uniformly throughout its length, then forming a continuous series of deeper corrugations from the accumulated metal and shaping the sheet to form flanges along the sides and an intermediate arch.

2. The method of making transversely-corrugated sheet-metal cores for concrete floor construction and the like, which consists in transversely corrugating a sheet to accumulate the metal uniformly throughout its length, then forming a continuous series of deeper corrugations from the accumulated metal and contemporaneously shaping the sheet to form flanges along the sides and an intermediate arch.

3. The method of making transversely-corrugated sheet-metal cores for concrete floor construction and the like, which consists in transversely corrugating a sheet to accumulate the metal uniformly throughout its length, then forming a continuous series of deeper corrugations from the accumulated metal and shaping the sheet to form reversely corrugated flanges along the sides and an intermediate arch.

4. The method of making transversely-corrugated sheet-metal cores for concrete floor construction and the like, which consists in transversely corrugating a sheet to accumulate the metal uniformly throughout its length then forming a continuous series of deeper corrugations from the accumulated metal and shaping the sheet to fully form flange angles along the sides and to partly form intermediate arch angles, and then fully forming the intermediate arch angles.

5. The method of making transversely corrugated sheet-metal cores for concrete floor construction and the like, which consists in transversely corrugating a sheet to accumulate the metal throughout its length, then forming a continuous series of deeper corrugations from the accumulated metal and shaping the sheet to form flanges along the sides and an intermediate arch.

6. The method of making transversely-corrugated sheet-metal cores for concrete construction and the like, which consists in transversely corrugating a sheet to accumulate the metal throughout its length, then forming a continuous series of deeper corrugations from the accumulated metal and shaping the sheet to form an arch intermediate the sides thereof.

7. The method of making transversely-corrugated sheet metal cores for concrete construction and the like, which consists in transversely corrugating a sheet to accumulate the metal uniformly throughout its length, then forming a continuous series of deeper corrugations from the accumulated metal and shaping the sheet to form an arch intermediate the sides thereof.

8. The method of making transversely-corrugated sheet-metal cores for concrete construction and the like, which consists in transversely corrugating a sheet to accumulate the metal uniformly throughout its length, and then forming a continuous series of deeper corrugations from the accumulated metal and contemporaneously shaping the sheet to form an arch intermediate the sides thereof.

9. The method of making transversely-corrugated sheet-metal cores for concrete construction and the like, which consists in transversely corrugating a sheet to accumulate the metal uniformly throughout its length, then forming a continuous series of deeper corrugations from the accumulated metal and shaping the sheet to partly form arch angles intermediate the sides thereof, and then fully forming the arch angles.

10. The method of corrugating a sheet of metal, which consists in corrugating the sheet to accumulate the metal uniformly throughout its extent, and then forming a continuous series of deeper contiguous corrugations from the accumulated metal without any substantial stretching or compression of the metal or further contraction of the initially corrugated sheet.

11. The method of corrugating a sheet of metal, which consists in corrugating the sheet to accumulate the metal through its extent, and then forming a continuous series of deeper contiguous corrugations from the accumulated metal without any substantial stretching or compression of the metal or further contraction of the initially corrugated sheet.

12. The method of corrugating a sheet of metal, which consists in corrugating the sheet to accumulate the metal uniformly throughout its extent, and then reversely corrugating alternate corrugations to form a continuous series of deeper corrugations from the accumulated metal.

13. The method of corrugating a sheet of metal, which consists in corrugating the sheet to accumulate the metal throughout its extent, and then reversely corrugating alternate corrugations to form a continuous series of deeper corrugations from the accumulated metal.

JULIUS H. SCHLAFLY.